United States Patent
Takabayashi et al.

(10) Patent No.: US 11,509,013 B2
(45) Date of Patent: Nov. 22, 2022

(54) STORAGE BATTERY MODULE

(71) Applicant: MITSUBISHI ELECTRIC CORPORATION, Tokyo (JP)

(72) Inventors: Hirokazu Takabayashi, Tokyo (JP); Hidetoshi Kitanaka, Tokyo (JP); Yukihiro Yoshida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 310 days.

(21) Appl. No.: 16/084,510

(22) PCT Filed: Mar. 23, 2016

(86) PCT No.: PCT/JP2016/059190
§ 371 (c)(1),
(2) Date: Sep. 12, 2018

(87) PCT Pub. No.: WO2017/163332
PCT Pub. Date: Sep. 28, 2017

(65) Prior Publication Data
US 2019/0081289 A1    Mar. 14, 2019

(51) Int. Cl.
*H01M 50/20* (2021.01)
*H01M 10/6553* (2014.01)
(Continued)

(52) U.S. Cl.
CPC ......... *H01M 50/20* (2021.01); *H01M 10/613* (2015.04); *H01M 10/617* (2015.04);
(Continued)

(58) Field of Classification Search
CPC .. H01M 2/04–2/06; H01M 10/60–617; H01M 2/10–1094; H01M 10/6553;
(Continued)

(56) References Cited

U.S. PATENT DOCUMENTS 5,585,204 A    12/1996 Oshida et al.
7,771,865 B2 *  8/2010 Takasaki ............ H01M 10/625
                                                 429/83
(Continued)

FOREIGN PATENT DOCUMENTS

JP    H07-192774 A    7/1995
JP    2002117821 A    4/2002
(Continued)

OTHER PUBLICATIONS

EPO Machine translations of JP 2008226744 originally published to Yoshitake on Sep. 25, 2008 (Year: 2008).*
(Continued)

*Primary Examiner* — Cynthia H Kelly
*Assistant Examiner* — Niara Trant
(74) *Attorney, Agent, or Firm* — Buchanan Ingersoll & Rooney PC

(57) ABSTRACT

A storage battery module includes battery cells, a first member and a second member opposing the first member across a substrate. The first member closes the space between adjacent terminals, and covers an open surface of a housing in a state where the terminals of the battery cells are exposed. The first member is formed of a material having a thermal resistance greater than or equal to a first threshold. The substrate opposing the battery cells across the first member has holes through which the terminals are inserted and a conductor formed therein so as to electrically connect the terminals. The second member opposing the first member across the substrate surrounds the terminals projecting from the holes and covers the substrate with the terminals exposed from the holes. The second member is formed of a material having a thermal resistance greater than or equal to a second threshold.

8 Claims, 7 Drawing Sheets

(51) Int. Cl.
  *H01M 10/617* (2014.01)
  *H01M 10/6561* (2014.01)
  *H01M 10/613* (2014.01)
  *H01M 10/647* (2014.01)
  *H01M 50/50* (2021.01)

(52) U.S. Cl.
  CPC ..... *H01M 10/647* (2015.04); *H01M 10/6553* (2015.04); *H01M 10/6561* (2015.04); *H01M 50/50* (2021.01)

(58) Field of Classification Search
  CPC ............. H01M 10/6561; H01M 50/20; H01M 10/617; H01M 10/647; H01M 50/50
  See application file for complete search history.

(56) References Cited

U.S. PATENT DOCUMENTS

| | | | |
|---|---|---|---|
| 9,478,776 B2* | 10/2016 | Lee | H01M 10/613 |
| 9,698,394 B2* | 7/2017 | Fink | H01M 2/1241 |
| 2010/0052692 A1 | 3/2010 | Yano et al. | |
| 2012/0148903 A1* | 6/2012 | Murata | H01M 50/20 |
| | | | 429/156 |
| 2014/0370343 A1 | 12/2014 | Nomoto et al. | |
| 2014/0370353 A1* | 12/2014 | Oshiba | H01M 10/625 |
| | | | 429/120 |
| 2015/0072211 A1 | 3/2015 | Nakamura et al. | |
| 2015/0243947 A1* | 8/2015 | Seto | H01M 2/206 |
| | | | 429/158 |

FOREIGN PATENT DOCUMENTS

| | | |
|---|---|---|
| JP | 2008226744 A | 9/2008 |
| JP | 5340676 B2 | 11/2013 |
| JP | 2014086246 A | 5/2014 |
| JP | 2015018790 A | 1/2015 |
| JP | 2015053205 A | 3/2015 |
| JP | 2015170454 A | 9/2015 |
| WO | 2012/011237 A1 | 1/2012 |
| WO | WO-2015178456 A1 * | 11/2015 .......... H01M 10/613 |

OTHER PUBLICATIONS

EPO English machine translation of WO 2015178456 originally published to Kosugi Shinichiro on Nov. 26, 2015 (Year: 2015).*
International Search Report (PCT/ISA/210) dated Jun. 28, 2016, by the Japan Patent Office as the International Searching Authority for International Application No. PCT/JP2016/059190.
Japanese Office Action (Notification of Reasons for Refusal) dated Aug. 31, 2017, issued in the corresponding Japanese Patent Application No. 2017-534621, and a English Translation thereof. (6 pages).
Japanese Office Action (Notification of Reasons for Refusal) dated Jan. 18, 2018, issued in the corresponding Japanese Patent Application No. 2017-534621, and a English Translation thereof. (7 pages).
Written Opinion (PCT/ISA/237) dated Jun. 28, 2016, by the Japan Patent Office as the International Searching Authority for International Application No. PCT/JP2016/059190.

* cited by examiner

STORAGE BATTERY MODULE

TECHNICAL FIELD

The present disclosure relates to a storage battery module equipped with battery cells.

BACKGROUND ART

In a storage battery module equipped with multiple battery cells, a temperature of a battery cell situated in the middle in an arrangement direction of the battery cells gets higher in comparison with a temperature of a battery cell situated at an end in the arrangement direction, resulting in a variance in specific resistivity among the battery cells. There is an issue where a lifespan of the storage battery module is shortened due to a variance in lifespans among battery cells caused by a variance in voltages among the battery cells because of the variance in specific resistivity.

In a battery system disclosed in Patent Literature 1, battery cells are disposed apart from each other with a cooling gap therebetween through which a cooling gas passes. A forceful blowing of air through the cooling gap makes it possible to efficiently cool the battery cells.

CITATION LIST

Patent Literature

Patent Literature 1: Japanese Patent No. 5340676

SUMMARY OF INVENTION

Technical Problem

In the case where cooling air is blown between the battery cells as in the battery system disclosed in patent literature 1, heat generated by the battery cells might be expelled to the periphery of the storage battery module from a terminal portion of the battery cell not exposed to the cooling air. The dissipation of heat unrelated to the cooling air can cause the temperature to rise inside the housing where the storage battery module is provided, and can even adversely affect other electrical apparatuses. Also, since the space in which a circuit substrate is provided is not hermetically sealed, after the cooling air passes through the space for the cooling air, the cooling air travels from that space through gaps, and flows into the space provided for the circuit substrate, and comes into contact with the circuit substrate. In a case where the outdoor air containing dust is used as the cooling air, dust might adhere to the circuit substrate surface, and the adhered dust can even cause corrosion or create a short circuit of the circuit substrate. In order to prevent dust from adhering to a surface of the circuit substrate, it is necessary to provide a dust-removal system for removing dust from the cooling air, yet such systems are complicated in structure and increase manufacturing costs.

In consideration of circumstances such as those described above, an objective of the present disclosure is to increase the amount of heat that is transferred to the cooling air from the storage battery module while also suppressing or preventing the dust from adhering to the substrate.

Solution to Problem

In order to achieve this objective, a storage battery module of the present disclosure includes battery cells, a first member, a substrate, and a second member. Inside a housing, the battery cells are arranged apart from each other, the arrangement defining spaces between the battery cells through which cooling air inflowing from a vent provided on the housing, passes. Surfaces on which terminals of the battery cells are disposed face an open surface of the housing. The first member closes space between adjacent that are adjacent to each other and covers the open surface in a state where the terminals of the battery cells are exposed. The first member is an insulating member having a thermal resistance that is greater than or equal to a first threshold. The substrate opposing the battery cells across the first member is provided with (i) holes through which the terminals are inserted, (ii) a conductor to electrically connect to the terminals inserted through the holes, and (iii) a control circuit. The second member opposing the first member across the substrate surrounds the terminals projecting from the holes of the substrate and covers the substrate in a state where each of the terminals is exposed from the substrate. The second member is an insulating member having a thermal resistance that is greater than or equal to a second threshold.

Advantageous Effects of Invention

According to the present disclosure, the disposing of a first member that closes space between terminals of adjacent battery cells and covers the open surface of the housing in a state where the terminals of the battery cells are exposed and the disposing of a second member opposing the first member across the substrate to surround the terminals projecting from the substrate and cover the substrate with the terminals exposed from the substrate enable the amount of heat that is transferred to the cooling air from the storage battery module to be increased while also suppressing or preventing the dust from adhering to the substrate.

DESCRIPTION OF EMBODIMENTS

Embodiments of the present disclosure are described below with reference to the drawings. Throughout the drawings, components that are the same or equivalent are assigned the same reference signs.

Embodiment 1

Figure 1:
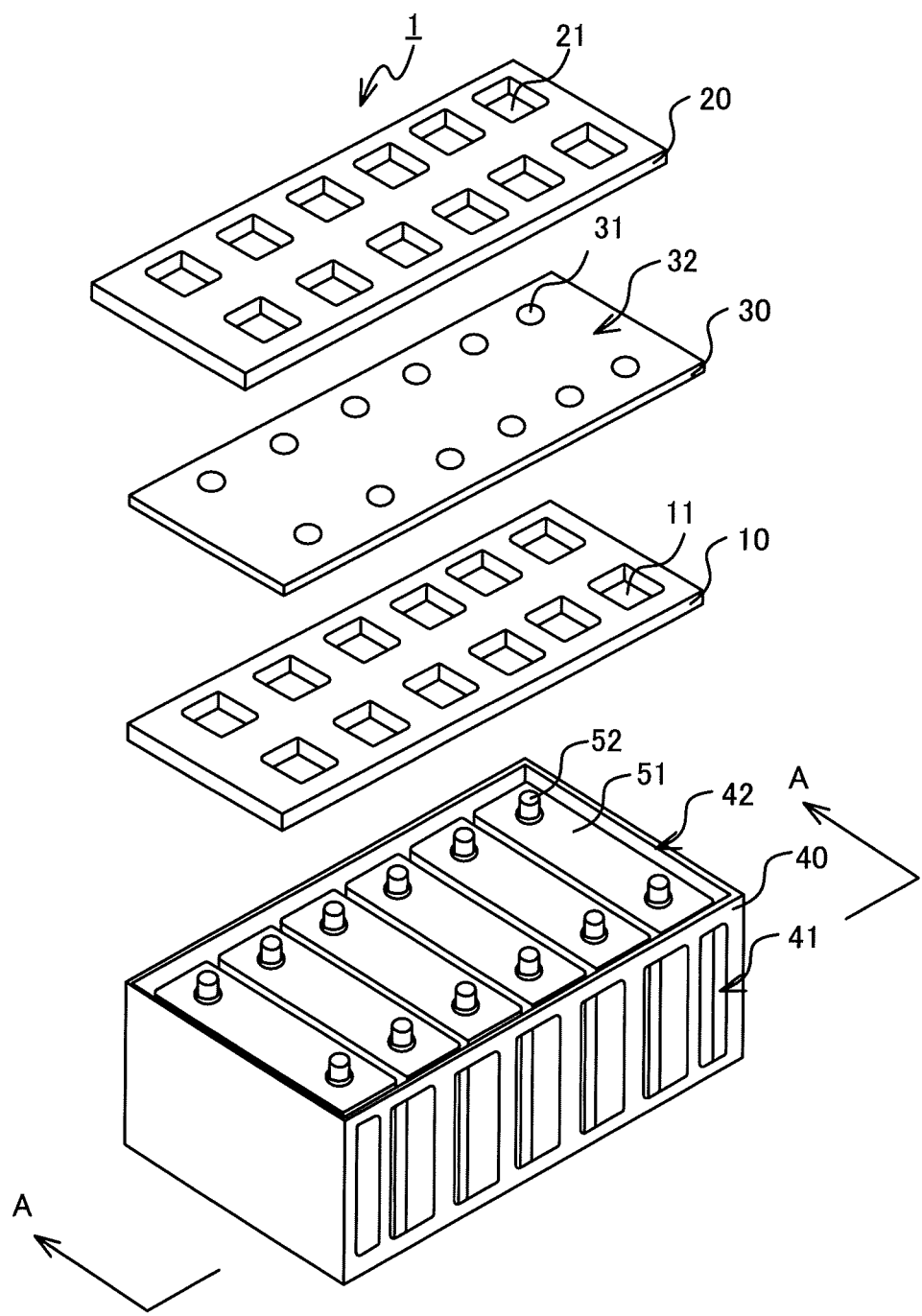
FIG. 1 is a perspective view illustrating a storage battery module according to Embodiment 1 of the present disclosure.

FIG. 1 is a perspective view illustrating a storage battery module according to Embodiment 1 of the present disclosure. A storage battery module 1 includes battery cells 51 that are stored inside a housing 40, a first member 10 that closes space between adjacent terminals 52 and covers an open surface 42 of the housing 40 in a state where the terminals 52 are exposed, a substrate 30 provided with (i) holes 31 through which the terminals 52 are inserted and (ii) a conductor to electrically connect the terminals 52 inserted through the holes 31, and a second member 20 opposing the first member 10 across the substrate 30 that surrounds each of the terminals 52 projecting from the holes 31 and covers the substrate 30 with the terminals 52 exposed. In FIG. 1, although the storage battery module 1 is equipped with six battery cells 51, the number of battery cells 51 may be any number equal to or greater than two.

The housing 40 is provided with a vent 41. Inside the housing 40, the battery cells 51 are arranged apart from each other, the arrangement defining spaces between the battery cells 51 through which cooling air entering the interior space of the housing 40, via the vent 41 provided on the housing 40, passes. The cooling air entering the interior space of the housing 40 passes between the battery cells 51 and then flows to outside of the housing 40 from non-illustrated discharge holes. The battery cells 51 are cooled by the cooling air passing between the battery cells 51. The terminals 52 of the battery cell 51 are exposed from holes 11 of the first member 10.

The substrate 30 opposes the battery cells 51 across the first member 10. The substrate 30 is provided with holes 31 through which the terminals 52 are inserted. In Embodiment 1, thickness of the second member 20 in a direction in which a main surface 32 of the substrate 30 opposes the second member 20 is greater than or equal to the length of the terminals 52 projecting from the holes 31 of the substrate 30. The second member 20 is provided with holes 21 through which the terminals 52 are inserted. The first member 10 and the second member 20 close the space between the adjacent terminals 52, and thus, a short circuit caused by a worker accidentally touching the adjacent terminals 52 with a tool can be avoided. In FIG. 1, although the hole 21 is a through-hole, the hole 21 does not have to be a through-hole as long as the hole 21 is of a depth that enables contact between the second member 20 and the substrate 30 while the terminal 52 is inserted in the hole 21.

The first member 10 is formed of an insulating member having a thermal resistance that is greater than or equal to a first threshold. The second member 20 is formed of an insulating member having a thermal resistance that is greater than or equal to a second threshold. The first threshold and the second threshold may be the same value or may be different in value. The first threshold and the second threshold can be determined in accordance with the amount of heat generated in the battery cell 51 and the substrate 30, and an allowable range for an amount of heat that is expelled to the outside of storage battery module 1 regardless of the cooling air. In Embodiment 1, the first member 10 and the second member 20 are filler having insulating properties, and each is attached to the substrate 30. An insulating member such as a resin may be used as the first member 10 and the second member 20. The first member 10 and the second member 20 are formed by filling filler onto the substrate 30 such that connecting portions of the terminals 52 of the substrate 30 are exposed, and the shape of the filler is adjusted such that the first member 10 covers the open surface 42.

The disposing of the first member 10 and the second member 20 enable the amount of heat that is transferred from the battery cells 51 and the substrate 30 to the cooling air to be increased. Therefore, the amount of heat that is transferred from the storage battery module 1 to the cooling air can be increased, thereby suppressing or preventing heat unrelated to the cooling air from being expelled to the periphery of the storage battery module 1. Specifically, the expelling of heat to the periphery of the open surface 42 from the battery cells 51 of the storage battery module 1 can be suppressed or prevented.

Figure 2:
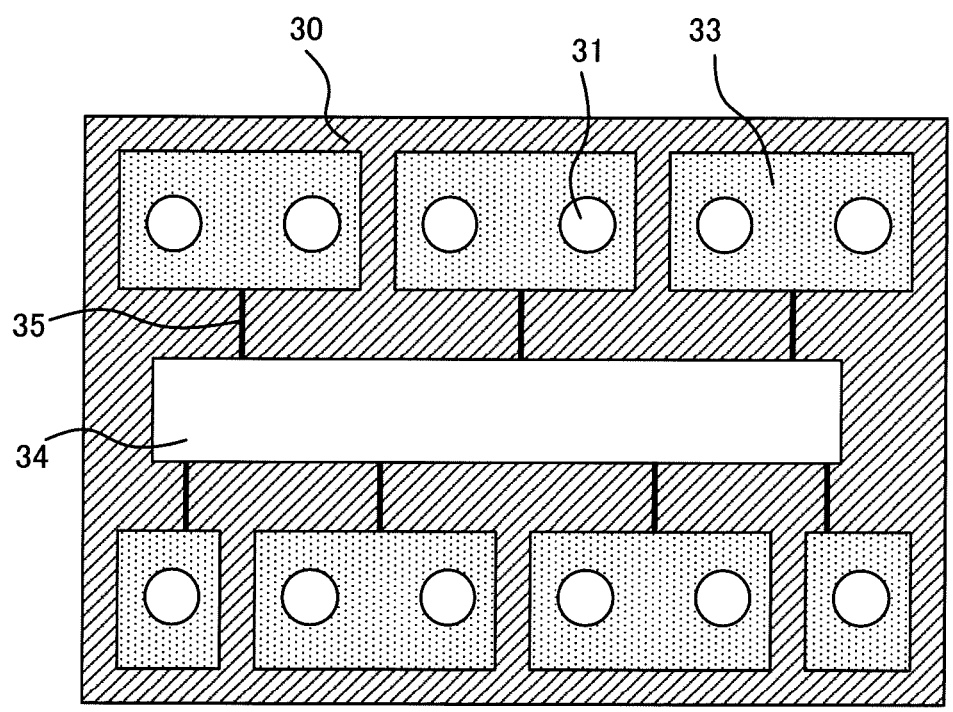
FIG. 2 is a plan view of a substrate according to Embodiment 1.

FIG. 2 is a plan view of the substrate according to Embodiment 1. In Embodiment 1, copper substrates 33 are embedded in the substrate 30. Each of the copper substrates 33 is provided with a hole 31 through which the terminal 52 is inserted. The terminals 52 that are inserted through the holes 31 are electrically connected by the copper substrate 33 that is a conductor. The copper substances 33 are insulated from one another. A control circuit 34 provided on the substrate 30 is connected with each of the copper substrates 33 via a voltage measurement pattern 35. The control circuit 34 measures electric potential of the copper substrates 33 acquired via the voltage measurement pattern 35, and performs control making all of the battery cells 51 have the same voltage based on the measured electric potential. The control circuit 34 may perform temperature detection for each of the copper substrates 33 in addition to performing cell balance control. As described above, since the first member 10 and the second member 20 cover the substrate 30 in a state where the terminals 52 are exposed, dust can be suppressed or prevented from adhering to the control circuit 34.

Figure 3:
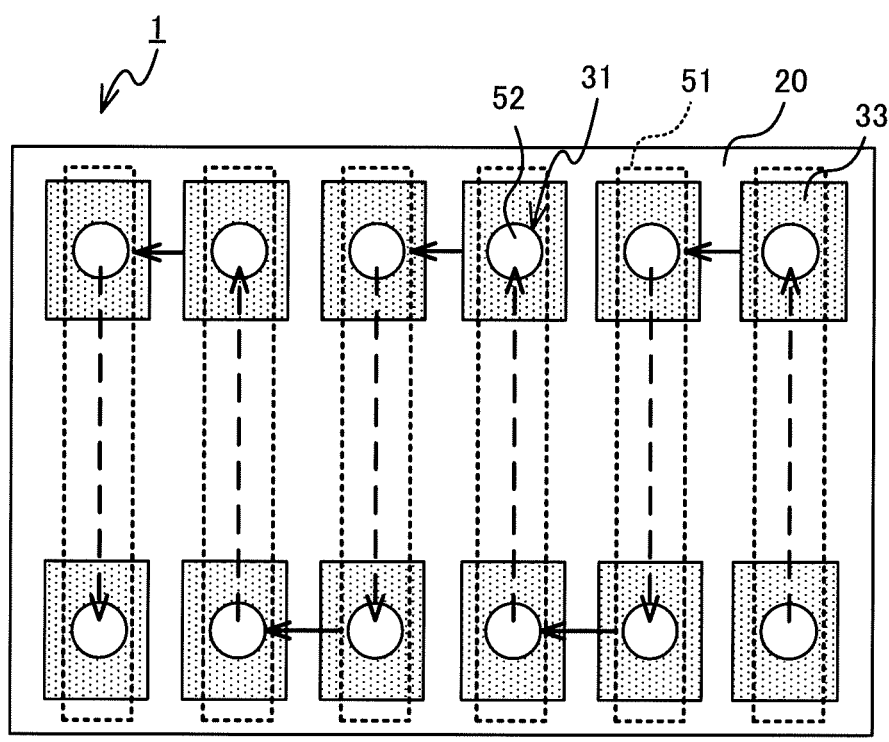
FIG. 3 is a plan view of the storage battery module according to Embodiment 1.

FIG. 3 is a plan view of the storage battery module according to Embodiment 1. In FIG. 3, solid-line arrows indicate current flow along the copper substrates 33 and dashed arrows indicate current flow within the battery cells 51. A circuit connecting the battery cells 51 in a series is formed by inserting the terminals 52 into the holes 31 provided in the copper substrates 33. Current flows from a positive electrode terminal of the storage battery module 1, via the copper substrates 33 and the terminals 52, to the battery cell 51 situated on the right end in FIG. 3. The current that flows within the battery cell 51 enters an adjacent battery cell 51 via the terminal 52 and the copper substrate 33. In this manner, the current flows from one battery cell 51 situated on the right end in FIG. 3 all the way to another battery cell 51 situated on the left end in FIG. 3. Current flows from the terminal 52 of the battery cell 51 situated on the left end in FIG. 3 to the negative electrode terminal of the storage battery module 1 via the copper substrate 33. The flow of current as described above generates heat in the battery cells 51 and the copper substrates 33.

Figure 4:
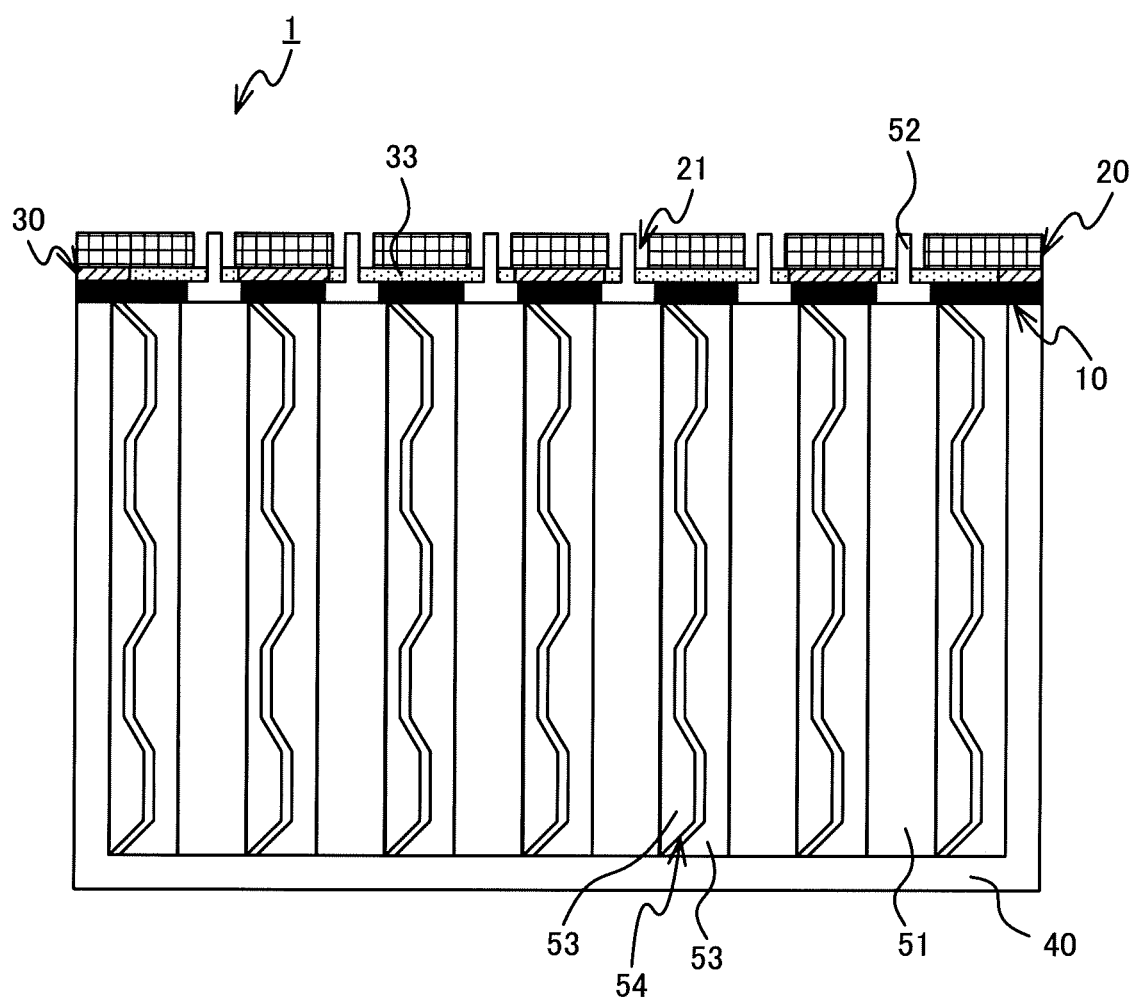
FIG. 4 is a cross-sectional view of the storage battery module according to Embodiment 1.

FIG. 4 is a cross-sectional view of the storage battery module according to Embodiment 1. FIG. 4 is a cross-sectional view along line A-A in FIG. 1. Inside the housing 40, spacers 53 are disposed such that the spacers 53 are in contact with the battery cells 51. Air that enters into the housing 40 from the vent 41 passes through a cooling gap 54 that is a space formed by spacers 53 opposing each other. As described above, the first member 10 covers the open surface 42 in a state where the terminals 52 are exposed. The substrate 30 opposes the battery cells 51 across the first member 10. The first member 10 can suppress or prevent dust contained in the air that passes through the cooling gap 54 from adhering to the substrate 30. As described above, the second member 20 covers the substrate 30 in a state where the terminals 52 projecting from the holes 31 of the substrate 30 are exposed. The second member 20 can suppress or prevent dust from adhering to the substrate 30.

Since the substrate 30 is sandwiched between the first member 10 that has a thermal resistance equal to or greater than a first threshold and the second member 20 that has a thermal resistance equal to or greater than a second threshold, the heat generated in the copper substrates 33 of the substrate 30 is expelled to the cooling gaps 54 via the terminals 52 and the battery cells 51. Since the open surface 41 is covered by the first member 10, the heat generated in the battery cells 51 is expelled to the cooling gaps 54.

Figure 5:
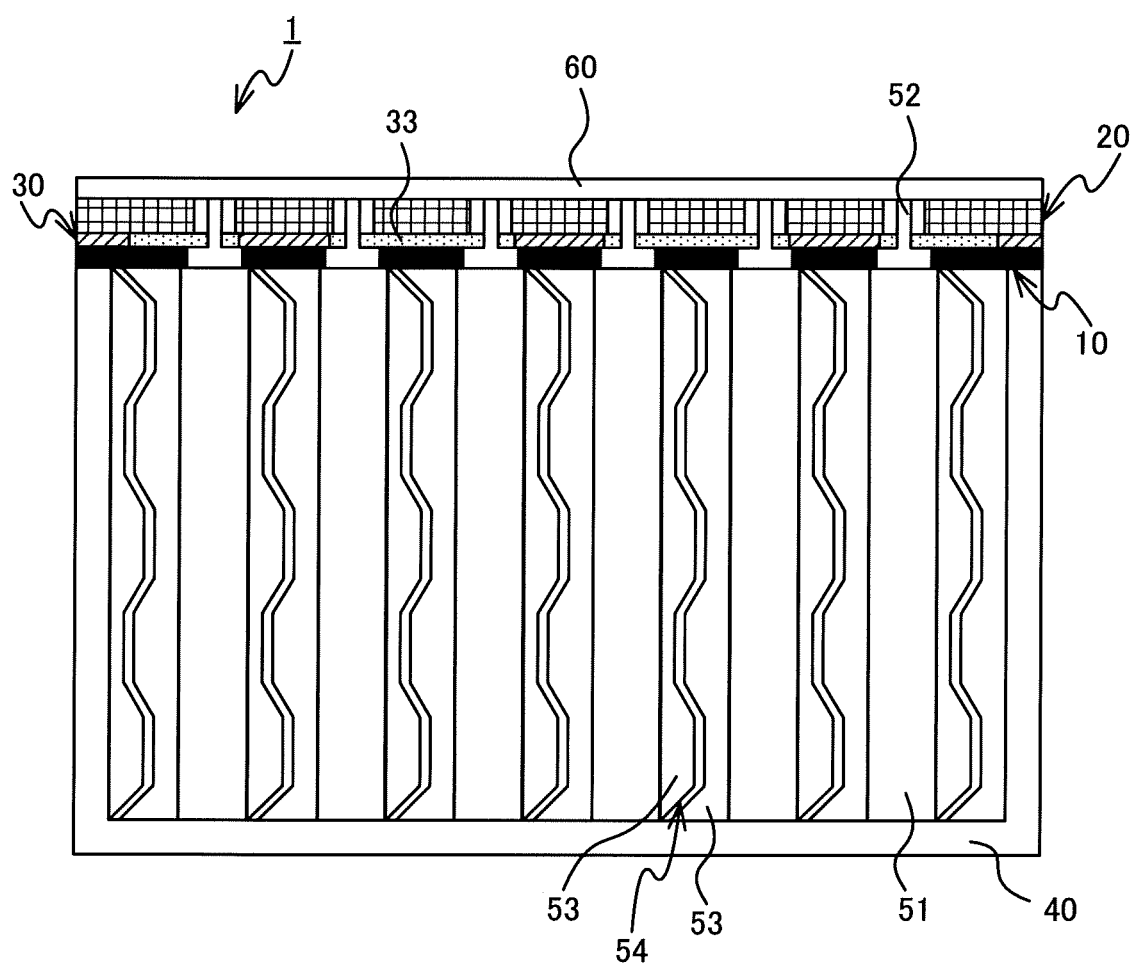
FIG. 5 is a cross-sectional view of the storage battery module according to Embodiment 1.

FIG. 5 is a cross-sectional view of the storage battery module according to Embodiment 1. The storage battery module 1 illustrated in FIG. 5 having the configuration in FIG. 4 also includes a cover 60 that is fixed to the housing 40 or the substrate 30 by non-illustrated nuts and bolts. By providing the cover 60, a short circuit caused by a worker accidently touching the terminals 52 with a tool can be avoided. Also, by providing the cover 60, dissipation of heat from the terminals 52 and dust adherence to the substrate 30 can be suppressed or prevented.

As described above, by using the storage battery module 1 according to Embodiment 1, the amount of heat that is transferred to the cooling air from the storage battery module 1 can be increased while also suppressing or preventing the dust from adhering to the substrate 30.

Embodiment 2

Figure 6:
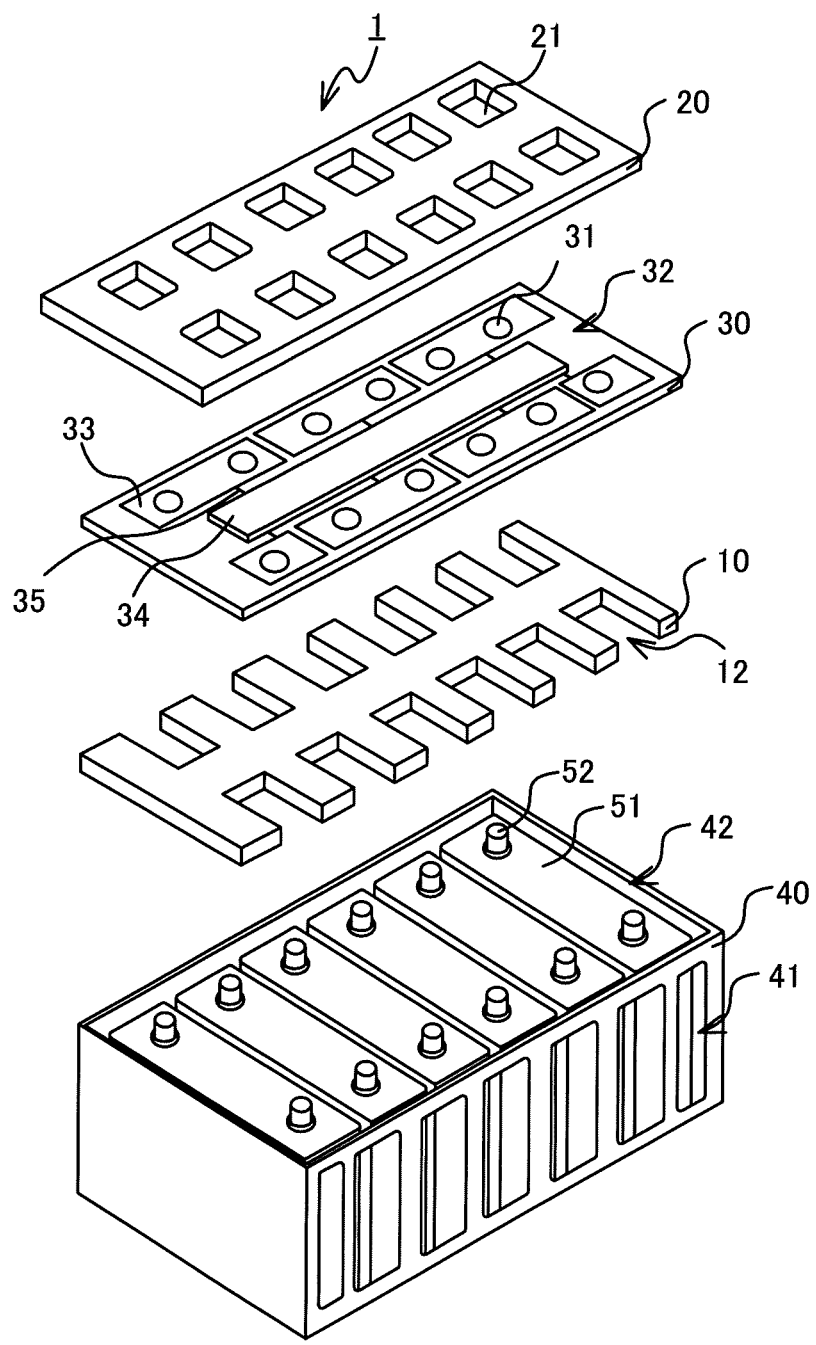
FIG. 6 is a perspective view of a storage battery module according to Embodiment 2 of the present disclosure.

FIG. 6 is a perspective view of a storage battery module according to Embodiment 2 of the present disclosure. In Embodiment 2, the first member 10 and the second member 20 are formed of an insulator. The structure of the substrate 30 is similar to that in Embodiment 1. The substrate 30 is provided with the holes 31, the copper substrates 33 that electrically connect the terminals 52 inserted through the holes 31 is embedded with the substrate 30, and is provided with a control circuit 34 that is connected to the copper substrates 33 by the voltage measurement pattern 35. The first member 10 is an insulating substrate provided with notches 12 that leave the terminals 52 exposed. By providing these notches 12, the first member 10 closes the space between the terminals 52 of the adjacent battery cells 51 while leaving the terminals 52 exposed. The second member 20 is an insulating substrate provided with holes 21 through which the terminals 52 are inserted. By providing the holes 21, the second member 20 surrounds each of the terminals 52 that project from the holes 31 and covers the substrate 30 in a state where the terminals 52 are exposed. Also, a portion of the second member 20 opposing the control circuit 34 provided on the substrate 30 is formed with a thickness that is thinner than other portions in accordance with the structure of the control circuit 34. By sandwiching the substrate 30 between the first member 10 and the second member 20 that are insulating substrates, dust can be suppressed or prevented from adhering to the substrate 30 and the amount of heat that is transferred to the cooling air from the battery cells 51 and the copper substrates 33 can be increased.

As described above, by using the storage battery module 1 according to Embodiment 2, the amount of heat that is transferred to the cooling air from the storage battery module 1 can be increased while also suppressing or preventing the dust from adhering to the substrate 30. The process of sandwiching the substrate 30 between the first member 10 provided with the notches 12 and the second member 20 provided with the holes 21 is easy in comparison with the process of filling the substrate 30 with filler, and can reduce manufacturing costs.

Embodiment 3

Figure 7:
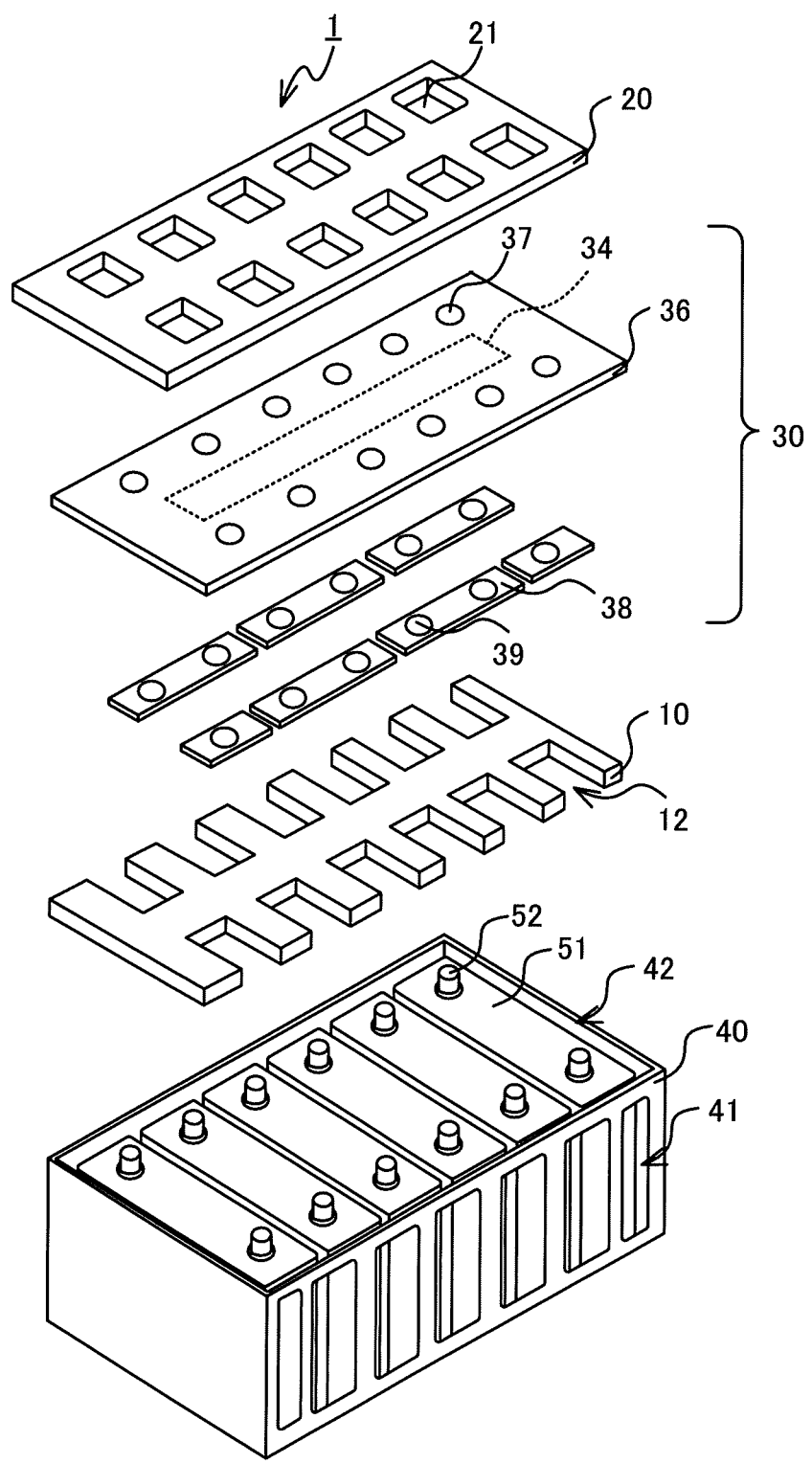
FIG. 7 is a perspective view of a storage battery module according to Embodiment 3 of the present disclosure.

FIG. 7 is a perspective view of a storage battery module according to Embodiment 3 of the present disclosure. The structure of the first member 10 and the second member 20 are similar to that in Embodiment 2. In Embodiment 3, the substrate 30 is formed with a substrate 36 that is provided with holes 37 and copper substrates 38 that are provided with holes 39. The substrate 36 is provided with the control circuit 34 similar to that in Embodiment 1. The substrate pattern connected to the control circuit 34 in the substrate 36 and the copper substrates 38 may be jointly fastened to the terminals 52 or may be electrically connected in another location. By sandwiching the substrate 30 between the first member 10 and the second member 20 that are insulating substrates, dust can be suppressed or prevented from adhering to the substrate 30 and the amount of heat that is transferred to the cooling air from the battery cells 51 and the copper substrates 38 can be increased.

As described above, by using the storage battery module 1 according to Embodiment 3, the amount of heat that is transferred to the cooling air from the storage battery module 1 can be increased while also suppressing or preventing the dust from adhering to the substrate 30. Since the process of embedding copper substrates into the substrate is unnecessary, manufacturing costs can be reduced.

Embodiments of the present disclosure are not limited to the above embodiments. The substrate 30 is not limited to a structure in which the copper substrates 33 are embedded. The substrate 30 may be a printed substrate. In such a case, the number of pattern layers in the print substrate may be freely-set in accordance with current flowing between the battery cells 51.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

1 Storage battery module
10 First member
11, 21, 31, 37, 39 Hole
12 Notch
20 Second member
30, 36 Substrate
32 Main surface
33, 38 Copper substrate
34 Control circuit
35 Voltage measurement pattern
40 Housing
41 Vent
42 Open surface
51 Battery cell
52 Terminal
53 Spacer
54 Cooling gap
60 Cover

The invention claimed is:
1. A storage battery module comprising:
   battery cells, to be disposed inside a housing, arranged apart from each other, the arrangement defining spaces between the battery cells through which cooling air inflowing from a vent provided on the housing passes, surfaces on which terminals of the battery cells are disposed facing an open surface of the housing;

a first member closing space between the terminals that are adjacent to each other and covering the open surface in a state where the terminals of the battery cells are exposed, the first member being an insulating member having a thermal resistance that is greater than or equal to a first threshold;

a substrate opposing the battery cells across the first member, the substrate including (i) holes through which the terminals are inserted, (ii) a conductor embedded in the substrate to electrically connect the terminals inserted through the holes, and (iii) a control circuit directly mounted on the substrate and connected to the conductor; and a second member opposing the first member across the substrate surrounding the terminals projecting from the holes of the substrate, and covering the substrate in a state where each of the terminals are exposed, the second member being an insulating member having a thermal resistance that is greater than or equal to a second threshold.

2. The storage battery module according to claim 1, wherein the battery cells are disposed such that the surfaces of the battery cells opposite to the surfaces on which the terminals are disposed are in contact with the surface of the housing opposite to the open surface.

3. The storage battery module according to claim 1, wherein the first member is an insulating member filled onto the substrate such that the terminals are exposed, and the second member is an insulating member filled onto the substrate such that the terminals projecting from the holes of the substrate are exposed.

4. The storage battery module according to claim 2, wherein the first member is an insulating member filled onto the substrate such that the terminals are exposed, and the second member is an insulating member filled onto the substrate such that the terminals projecting from the holes of the substrate are exposed.

5. The storage battery module according to claim 1, wherein the first member is provided with notches to expose the terminals, the first member being an insulating substrate for covering the open surface, and the second member is provided with holes through which the terminals projecting from the holes of the substrate are inserted, the second member being an insulating substrate for covering the substrate.

6. The storage battery module according to claim 2, wherein the first member is provided with notches to expose the terminals, the first member being an insulating substrate for covering the open surface, and the second member is provided with holes through which the terminals projecting from the holes of the substrate are inserted, the second member being an insulating substrate for covering the substrate.

7. The storage battery module according to claim 1, further comprising a cover covering the second member and opposing the substrate across the second member.

8. The storage battery module according to claim 2, further comprising a cover covering the second member and opposing the substrate across the second member.

* * * * *